United States Patent [19]
Provost

[11] Patent Number: 6,066,281
[45] Date of Patent: May 23, 2000

[54] FASTENER PRODUCTS AND THEIR PRODUCTION

[75] Inventor: George A. Provost, Litchfield, N.H.

[73] Assignee: Velcro Industries B.V., Netherlands

[21] Appl. No.: 09/098,062

[22] Filed: Jun. 16, 1998

[51] Int. Cl.[7] .......................... B29C 47/18; B29C 47/06
[52] U.S. Cl. .............. 264/167; 264/173.17; 264/177.16; 425/380; 425/465; 425/466
[58] Field of Search .......................... 264/177.16, 177.1, 264/167, 173.16, 173.17; 425/465, 466, 380; 24/452, 442, 446, 448

[56] References Cited

U.S. PATENT DOCUMENTS

| | | | |
|---|---|---|---|
| 3,172,154 | 3/1965 | Martin et al. ............................. | 18/12 |
| 3,193,604 | 7/1965 | Mercer ..................................... | 264/209 |
| 3,252,181 | 5/1966 | Hureau ..................................... | 18/12 |
| 3,266,113 | 8/1966 | Flanagan, Jr. ........................... | 24/204 |
| 3,280,847 | 10/1966 | Chisholm et al. ..................... | 138/121 |
| 3,422,648 | 1/1969 | Lemelson ................................. | 72/8 |
| 3,551,543 | 12/1970 | Mercer et al. .......................... | 264/167 |
| 3,932,090 | 1/1976 | Brumlik ................................... | 425/381 |
| 4,001,366 | 1/1977 | Brumlik ................................... | 264/147 |
| 4,419,315 | 12/1983 | Kessler .................................... | 264/145 |
| 4,567,773 | 2/1986 | Azzola et al. .......................... | 264/167 |
| 4,584,150 | 4/1986 | Ballocca ................................. | 264/40.1 |
| 4,894,060 | 1/1990 | Nestegard ................................ | 604/391 |
| 4,960,375 | 10/1990 | Saito et al. ............................. | 425/131.1 |
| 5,011,642 | 4/1991 | Welygan et al. ....................... | 264/167 |
| 5,066,444 | 11/1991 | Behr ........................................ | 264/171 |
| 5,077,870 | 1/1992 | Melbye et al. .......................... | 24/452 |
| 5,212,853 | 5/1993 | Kaneko ................................... | 24/452 |
| 5,385,703 | 1/1995 | Shanok et al. . | |
| 5,398,387 | 3/1995 | Torigoe et al. . | |
| 5,679,303 | 10/1997 | Hayashi et al. ........................ | 264/167 |
| 5,891,549 | 4/1999 | Beretta et al. .......................... | 428/100 |

FOREIGN PATENT DOCUMENTS

| | | |
|---|---|---|
| 0 931 472 A2 | 7/1999 | European Pat. Off. . |
| 2082591 | 12/1971 | France . |
| 1413 163 | 11/1975 | United Kingdom . |
| WO 96/21528 | 7/1996 | WIPO . |

Primary Examiner—Jan H. Silbaugh
Assistant Examiner—Mark Eashoo
Attorney, Agent, or Firm—Fish & Richardson P.C.

[57] ABSTRACT

A machine and method of extruding a fastener product is disclosed. The product has a continuous, sheet-form base and rows of discrete fastener elements that extend from a side of the base, and is formed by extruding a molten polymer through an extrusion die defining a die opening comprising a base opening for extrusion of the base of the product, and, contiguous therewith, a series of fastener element openings for extrusion of the rows of fastener elements, each fastener element opening having a profile configured to form oppositely directed sides of the discrete fastener elements of one row. While extruding the product, flow of polymer through the fastener element openings is periodically interrupted while continuing the flow of the polymer through the base opening, thereby forming rows of upstanding fastener elements integrally extruded with a sheet-form base. Fastener products formed by this method are also disclosed.

23 Claims, 9 Drawing Sheets

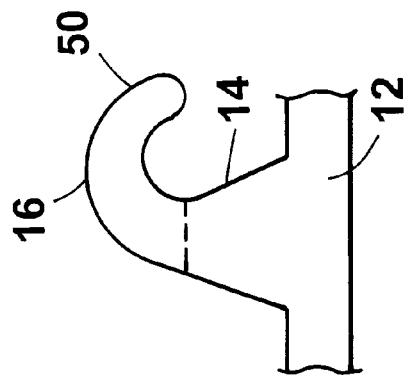
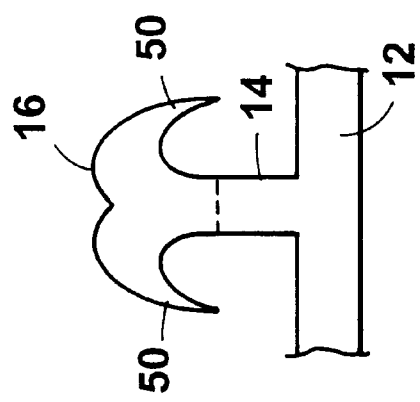
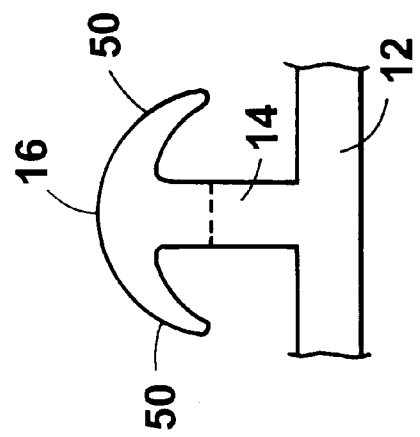

FASTENER PRODUCTS AND THEIR PRODUCTION

BACKGROUND OF THE INVENTION

This invention relates to fastener products and methods and machines for producing them.

Continuous strip-form fastener products having fastener elements (e.g., hooks) are produced in a continuous molding process employing a rotating mold roll, as described, e.g., in U.S. Pat. No. 4,794,028.

Continuous strip-form fastener products are also formed by a process of extruding a preform comprising continuous rail-like elements on a base sheet, and after extrusion, cutting the formed elements at spaced intervals and stretching the base sheet to separate the rail-like segments, as described, e.g., in U.S. Pat. No. 4,894,060.

To form a fastener element overhanging the stem in all directions, a post-forming process has been employed to deform molded features to form, for instance, mushroom-type fastening elements.

SUMMARY OF THE INVENTION

This invention features a method of forming a fastener product having fastener elements with heads that may overhang stems in both cross-machine and machine directions. The invention features extruding a molten polymer through an extrusion die and selectively and periodically interrupting the extrusion flow through certain portions of the extrusion die opening, thus varying the shape of the extrusion in a time-varying manner as extrusion proceeds.

According to one aspect of the invention, a method of forming a fastener product is provided. The product has a continuous, sheet-form base and rows of discrete fastener elements that extend from a side of the base. The method includes extruding a molten polymer through an extrusion die while periodically interrupting flow of the polymer through selected regions of the die. The die defines a die opening with a base opening for extrusion of the base of the product, and, contiguous with the base opening, a series of fastener element openings for extrusion of the rows of fastener elements. Tach fastener element opening has a profile configured to form oppositely directed sides of the discrete fastener elements of one row. While extruding polymer through the die, the flow of polymer through the fastener element openings is periodically interrupted while continuing the flow of the polymer through the base opening, thereby forming rows of upstanding fastener elements integrally extruded with a sheet-form base.

In a presently preferred method, the flow of polymer through the fastener element openings is periodically interrupted by moving a gate adjacent the die opening.

In one configuration, the fastener element openings each include first and second regions. The method involves moving a first gate to interrupt the flow of polymer through the first regions of the fastener element openings, and, independent of moving the first gate, moving a second gate to interrupt the flow of polymer through the second regions of the fastener element openings. The two gates are moved, in the illustrated embodiment, in perpendicular directions.

In some embodiments described below, the fastener elements each have a stem portion extending from the base and extruded through the first region of a fastener element opening, and a head portion overhanging the stem portion and integrally extruded with the stem portion through the second region of a fastener element opening. The method of manufacture includes moving the first gate to periodically open and close the first regions of the fastener element openings to form the stem portions of the fastener elements, and moving the second gate to periodically open and close the second regions of the fastener element openings to form the head portions of the fastener elements.

The two gates may be moved in the sequence of opening the second gate to begin the formation of the head portion of a fastener element, and then opening the first gate to begin the formation of the stem portion of the fastener element while leaving the second gate open.

After opening the first gate, the extrusion method may involve closing the first gate to complete the formation of the stem portion of the fastener element, and subsequently closing the first gate to complete the formation of the head portion of the fastener element.

In some embodiments the second gate is moved away from the base opening to open the second regions of the fastener element openings at a controlled rate, thereby forming fastener element head portions which are tapered in the direction of extrusion.

Employing the above technique, fastener elements may be formed with head portions which overhang the stem portions of the fastener elements on all their sides. In some cases, the head portions of the fastener elements extend toward the base. If desired, the timing of the gate motion may be varied to produce a product with non-uniform fastener element spacing.

In some embodiments, two or more different polymer materials are simultaneously co-extruded to form a single fastener product. In some cases, the base of the fastener product is formed substantially of one co-extruded polymer material, while the fastener elements are formed of another co-extruded polymer material. In some other cases, the base and the stem portions of the fastener elements are formed substantially of one co-extruded polymer material, while the head portions of the fastener elements are formed of another co-extruded polymer material. In yet another instance, the head portions of the fastener elements are formed of one of the co-extruded materials, while the stem portions are formed of another of the co-extruded materials.

In some embodiments the sheet-form base of the extruded product is subsequently stretched to increase the distance between adjacent fastener elements.

According to another aspect of the invention, an extrusion die, for extruding a polymer to form a continuous fastener product having rows of discrete fastener elements integrally formed with and extending from a strip-form base, is provided. The die defines a base opening for extruding the strip-form base, and a series of fastener element openings, contiguous with the base opening, for extruding the fastening elements. The die includes at least one gate adapted to be moved with respect to the base opening to periodically interrupt the extrusion of the polymer through the fastener element openings while allowing a continuous flow of polymer through the base opening.

In some preferred embodiments, the die has at least two gates, each gate adapted to be moved periodically to interrupt the extrusion through an associated portion of each fastener element opening.

Preferably for some applications, the base opening has a thickness of less than about 0.015 inch.

In one illustrated embodiment, the fastener element openings each include a rectangular stem-forming portion stem-forming opening extending from the base opening, and a head-forming portion overhanging, in profile, the stem-forming portion. The head-forming portions of the fastener element openings are, in some cases, triangular.

According to another aspect of the invention, an extruded polymer fastener product formed with an extrusion die defining a longitudinal extrusion direction is provided. The product has an extruded sheet-form base and an array of discrete fastener elements integrally extruded with and extending from the base. Each fastener element has as-extruded sides facing in the longitudinal extrusion direction.

In some cases the product is in the form of a linear extrusion, with the discrete fastener elements having longitudinally extending surfaces of polymer extruded along corresponding stationary die surfaces. The fastener elements also have transversely extending surfaces, perpendicular to the direction of extrusion, of polymer extruded along corresponding reciprocating die surfaces.

In some embodiments, each fastener element has a stem portion integrally extruded with and extending from the base, and a head portion overhanging the stem portion in the longitudinal extrusion direction.

The head portions of the fastener elements are adapted, in some configurations, to engage loops to form a fastening.

In some embodiments, the head portions extend toward the base to form crooks.

In some arrangements, the head portions are wedge-shaped, each tapering in width in the longitudinal direction to a narrow upper edge.

The above-described method may be employed to extrude fastener products with integrally formed fastener elements that, in their as-extruded form and therefore not requiring a separate post-forming operation, advantageously overhang the stem in substantially all directions (i.e., both cross-machine and extrusion directions). In particular, the head portions of the fastener elements may protrude laterally beyond (i.e., overhang) their corresponding stem portions on both longitudinal and transverse sides. Such fastener elements may be useful for engaging fibers or loops (as in a "hook-and-loop" fastener) or each other (as in a "self-engaging" fastener). The invention can provide a cost-effective product by not requiring additional steps of cutting, stretching, or postforming in many applications.

Other features and advantages of the invention will be apparent from the following description of embodiments, and from the claims.

BRIEF DESCRIPTION OF THE DRAWINGS

FIGS. 4A–4C are examples of extrusion die profiles for forming fastener elements with re-entrant head portions.

DESCRIPTION OF EMBODIMENTS

Figure 1:
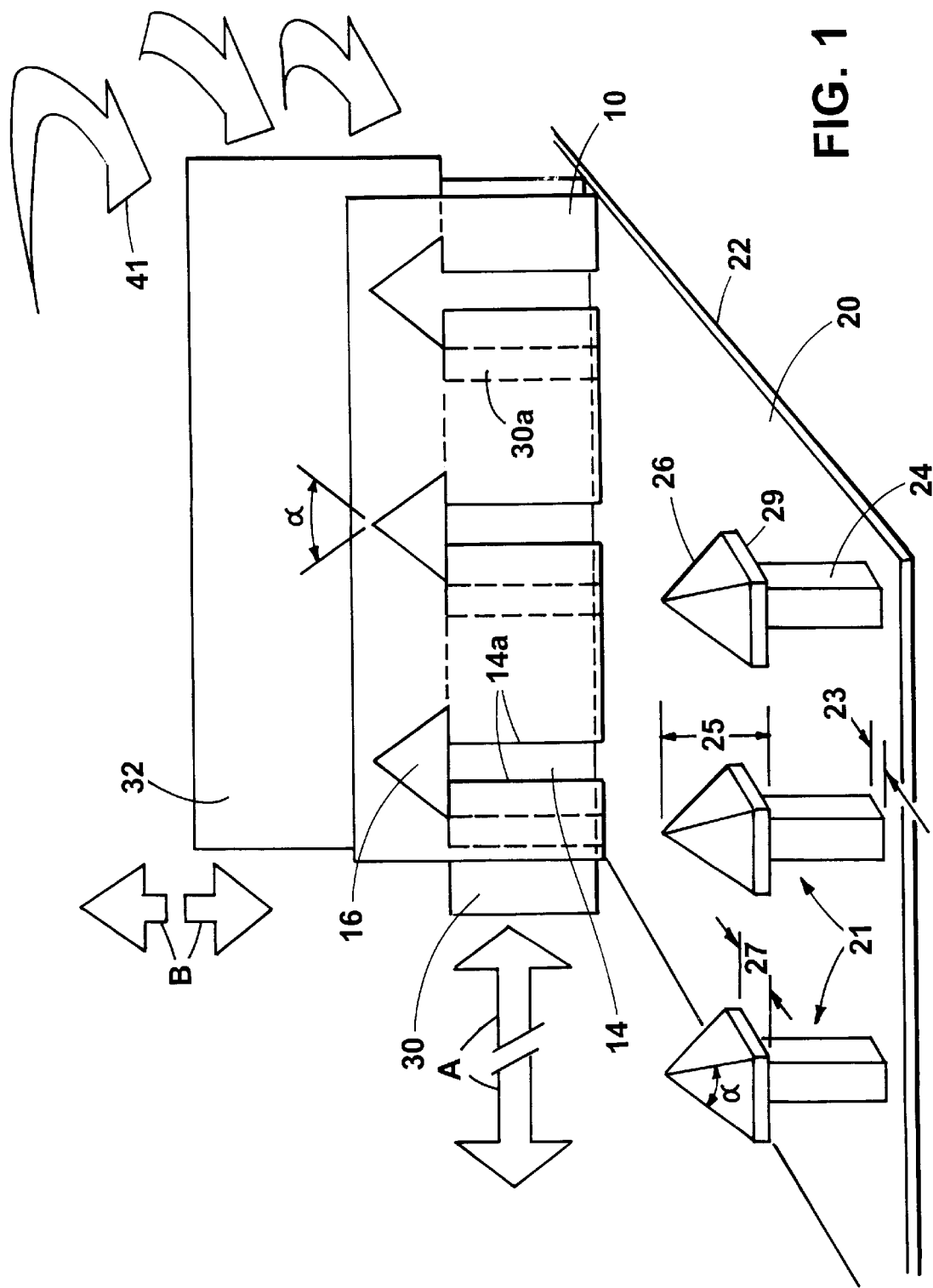
FIG. 1 schematically illustrates an interrupted extrusion process for forming a fastener product.
Figure 1A:
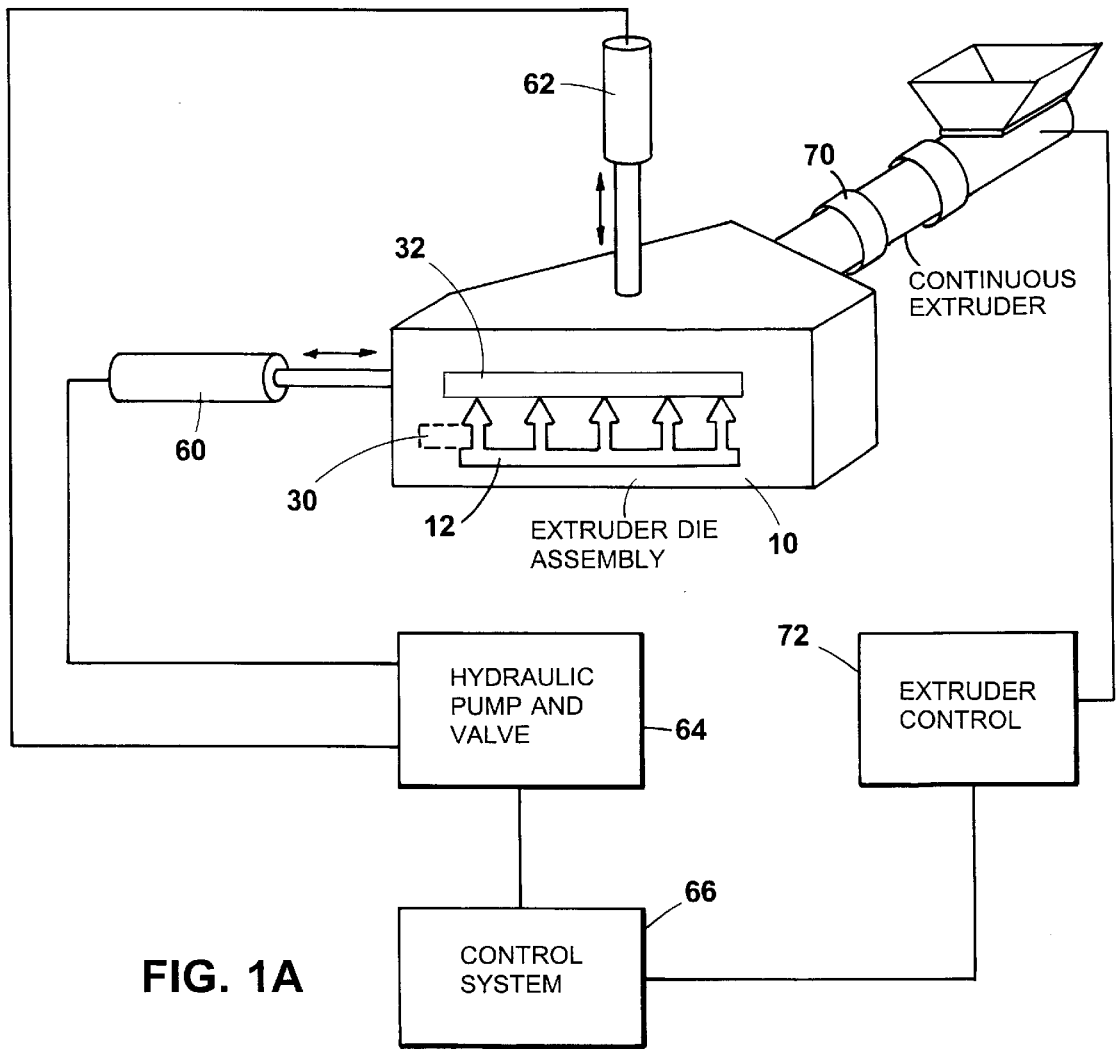
FIG. 1A is a diagram of a machine for implementing the process of FIG. 1.

Referring to FIGS. 1 and 1A, an extruder 70, operated by controls 72, introduces molten polymer to an extrusion die 10 under pressure to extrude fastener product 20, comprised of a sheet-form base 22 and discrete, integrally extruded fastener elements 21.

The extrusion die includes gates 30 and 32 which are driven by respective hydraulic rams 60 and 62 to periodically reciprocate within a die housing. A hydraulic pump and valves 64 are actuated to move the rams at a desired sequence and rate by a control system 66 which may be logically referenced to the extruder control 72 as shown. The electro-hydraulic actuators and control technology required for moving the gates is as is known in the art of high speed actuators.

Figure 2:
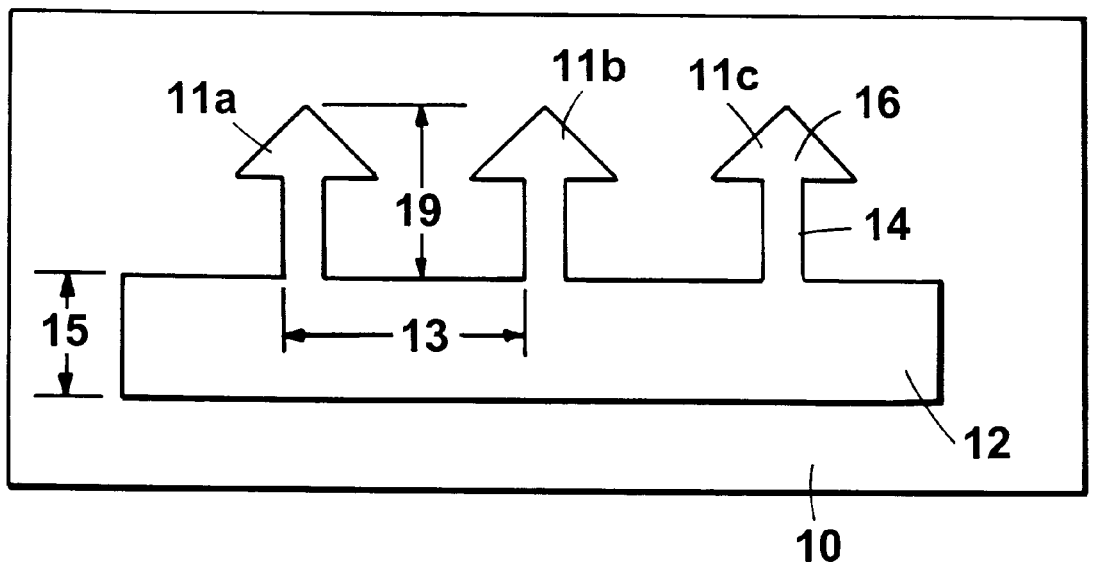
FIG. 2 is a schematic diagram of an extrusion die.

Molten polymer flows in the direction of the arrows 41 and passes through the orifice of the extrusion die 10. The orifice of extrusion die 10, as shown also in FIG. 2, features a rectangular base opening 12 and a row of fastener element openings 11a, 11b and 11c contiguous with the base opening. Although only three openings are shown for purposes of illustration, a typical embodiment would have many (e.g., 20 or more) openings. Each fastener element opening forms a corresponding row of fastener elements and has a stem-forming opening 14 and a head-forming opening 16. The overall dimensions and geometric configuration of the fastener elements and the spacing between adjacent rows are determined by the geometry and the dimensions of the extrusion die profile. In this example, each fastener element 21 has a stem portion 24 of square cross-section and an overhanging pyramidal head portion 26. The stem portions have sides extending in the longitudinal (extrusion) direction that correspond to the sides 14a of the die orifice. The transversely extending sides of the stem portions are likewise substantially flat and are formed by the stem-forming gate described below. Head portions 26 have flat tapered sides, extending upward to an apex having an included angle a of 60 degrees as determined by the shape of the openings. The thickness 23 of stem portions 24 is 0.015 inch. Head portions 26 have square, flat lower sections where they are joined to the stem portions, with side length 27 of 0.045 inch. The height 25 of head portions 26 is 0.039 inch. The overall height 19 of the fastener openings, and hence the height of the fastener elements, is 0.120 inch. As shown in FIG. 2, the spacing 13 of the fastener elements between adjacent rows is 0.050 inch and the base opening has a height 15 of 0.010 inch.

To form the discrete, upstanding fastener elements 21, the flow of molten polymer is periodically interrupted by sliding gate 30 left and right (as illustrated by arrows A) and gate 32 up and down (as illustrated by arrows B), in each case parallel to the face of the extrusion die 10 and perpendicular to the flow 41. Gate 30 controls the flow of the molten polymer 40 through the stem-forming openings 14, and gate 32 controls the flow of the molten polymer through the head-forming openings 16 of the fastener element openings 11. Gate 30 defines openings 30a that are aligned with the stem-forming portions 14 of the die opening to enable extrusion flow to form fastener element stem portions. Although only the forward profile of gate 30 is shown, it should be understood that its structure between openings 30a is all interconnected, by structure not shown upstream of the die opening, to move in unison.

Figure 3A:
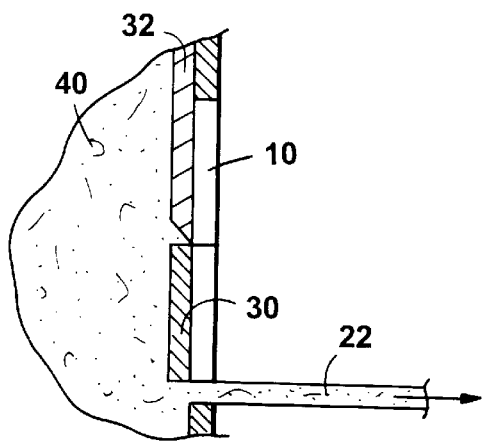
FIGS. 3A–3E are cross-sectional views taken along line 3—3 in FIG. 1, sequentially illustrating the extrusion of a fastener product.
Figure 3B:
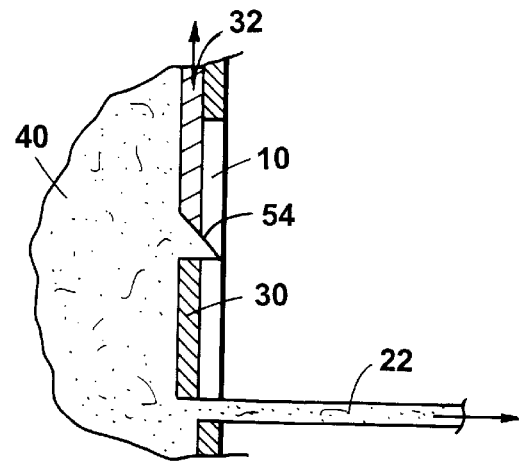
Figure 3C:
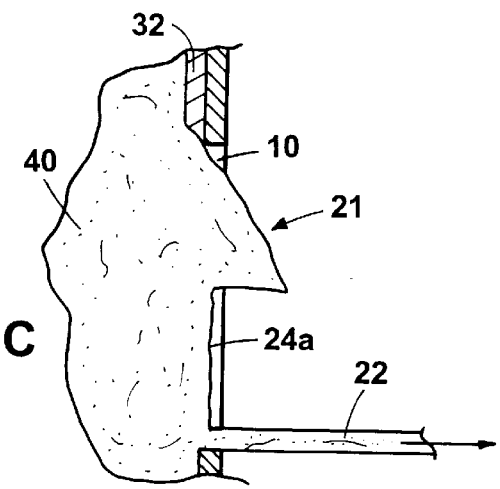
Figure 3D:
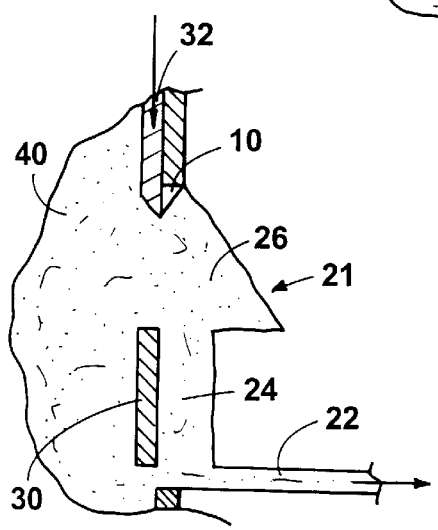
Figure 3E:
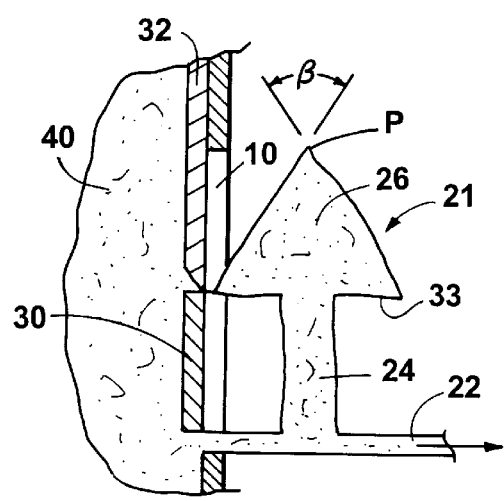

The sequence of gate motions for forming a column of fastener elements (one element per row) is illustrated in FIGS. 3A to 3E. While extruding base web sections between columns of fastener elements (FIG. 3A), both gates 30 and 32 block the molten polymer flow through the fastener element openings. To begin the formation of the head portions of a column of fastener elements (FIG. 3B), gate 32 is raised. The rate of ascent of gate 32, along with the extrusion rate through the fastener element opening, determines the taper rate of the leading edge of the fastener element head portions. In this example, gate 32 is raised at a steady rate, thereby forming a substantially flat, tapered forward head surface 54. While gate 32 continues to rise, gate 30 is moved to open the stem portions of the die opening to begin formation of stem portions integrally extruded with the base and head portions (FIG. 3C). The leading transverse surface 24a of the stem portions is formed against the inward surface of gate 30, which is rapidly retracted to form a substantially transverse stem surface. When gate 32 reaches its uppermost position, it is lowered at a rate similar to that at which it was raised, forming the trailing surface of the fastener element head portions (FIG. 3D). At the appropriate time in the cycle, as gate 32 is still lowering, gate 30 is quickly moved to block further flow through the stem portions of the die opening, thereby forming the trailing transverse surfaces of the stem portions of the column of fastener elements. When gate 32 has returned to its original, lowered position (FIG. 3E), the column of discrete fastener elements is left upstanding from the base. Each fastener element 21 has a pointed pinnacle P formed as gate 32 traversed its uppermost position, which defines an included angle $\beta$ of 60 degrees. All of the fastener elements are thus formed of one continuous extrusion of polymer, and have the molecular structure common to extruded products. Employing the above sequence of gate motions, fastener elements are formed with head portions that overhang their stem portions in both forward and rearward directions along the direction of extrusion, creating undercuts 33 (FIG. 3E) in the machine direction on both their front and back sides. Such overhanging structures are also created on the two longitudinally extending sides of each fastener element by the die profile shown in FIG. 1. Thus, a ledge 29 (FIG. 1) extending completely around the stem 24 is formed.

Figure 8:
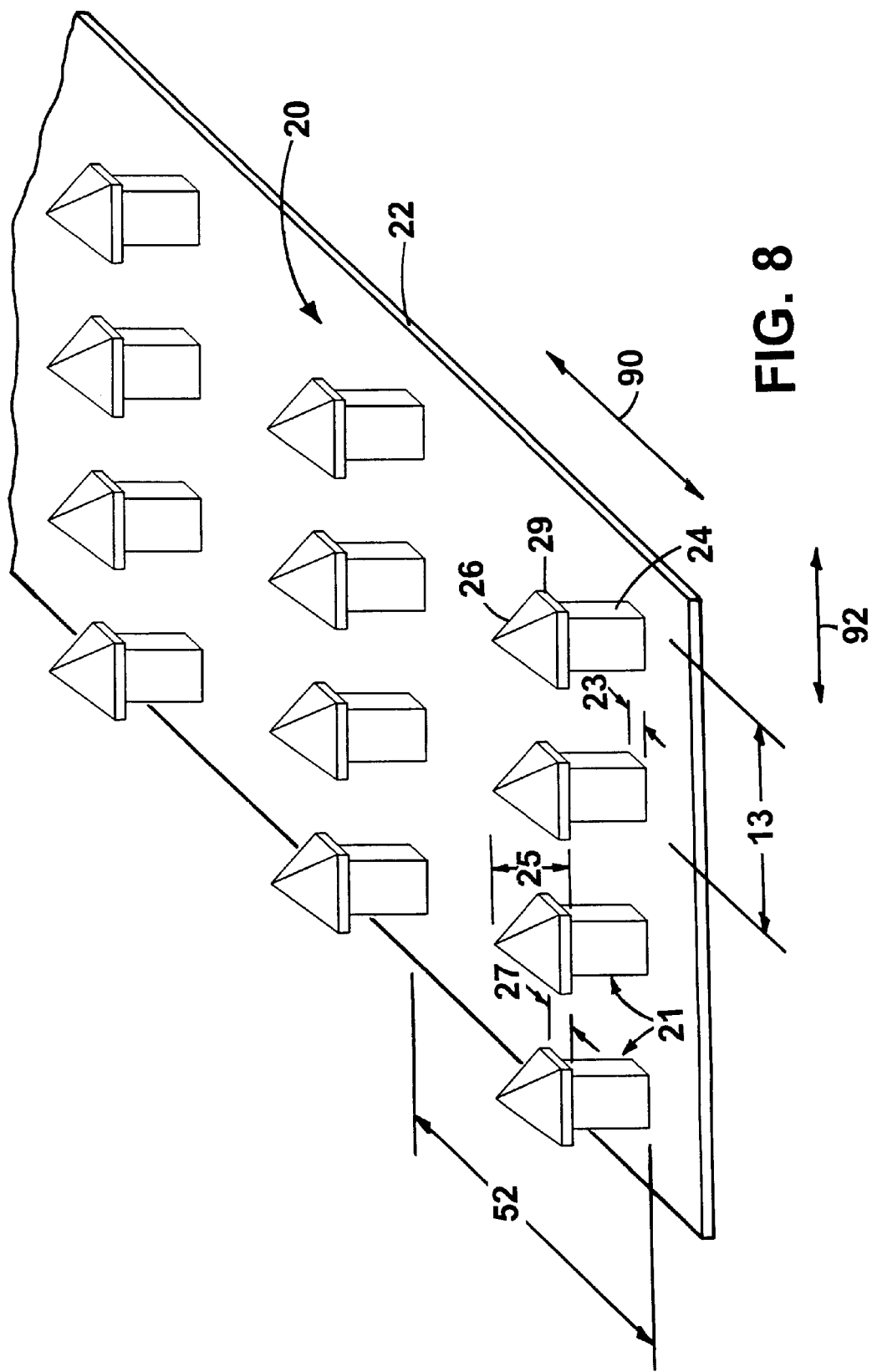
FIG. 8 is a perspective view of a fastener product.

Referring to FIG. 8, the distance 52 between adjacent fastener elements 21 within a row (i.e., the distance between adjacent columns), the fore/aft dimension 27 of the head portions 26, and the width 23 of the stem portions in the extrusion direction are controlled by controlling the timing of the periodic gate motion. In one example, an extrusion speed of 15 feet per minute and a gate speed of 3000 cycles per minute result in a spacing 52 between adjacent columns of 0.060 inch. The extrusion direction in FIG. 8 is illustrated by arrow 90, while the transverse (i.e., cross-machine) direction is illustrated by arrow 92.

Fastener elements formed in this manner may be employed to engage a cooperating fastener member (for instance, a fastener member of like construction) or a product with engagable loops.

Products may also be formed with fastener elements which are re-entrant (i.e., have portions which extend toward the base). FIGS. 4A–4C illustrate examples of die profiles for forming such fastener elements. A dashed line in each profile represents the line of contact of the head-forming gate and the stem-forming gate. In each case an extension 50 of the head-forming portion of the die opening extends toward the base opening 12, forming a crook or recess between portion 50 and the stem opening 14. The profiles of FIGS. 4A and 4B are for forming fastener elements with crooks on two lateral, opposite sides, while the profile of FIG. 4C forms fastener elements having a crook on only one lateral side. The profile of FIG. 4C also has a tapered stem opening 14, for forming fastener element stems having a tapering width in the lateral direction.

Figure 5C:
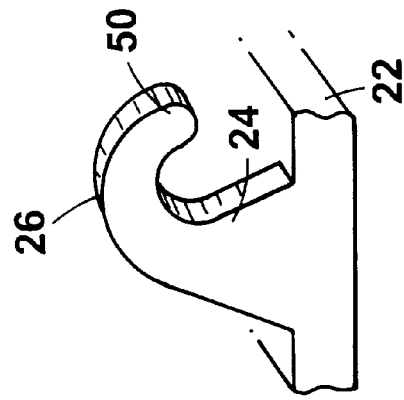
FIGS. 5A–5C illustrate fastener elements formed by extruding polymer through the die profiles of FIGS. 4A–4C, respectively, and interrupting flow with a single gate.
Figure 5B:
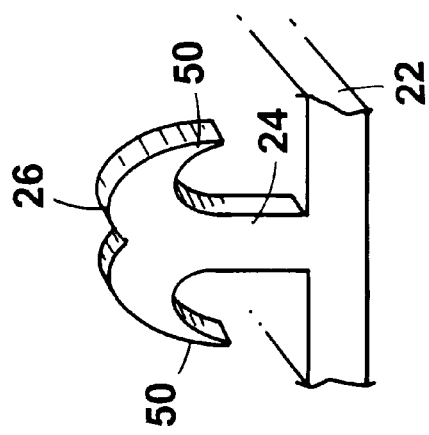
Figure 5A:
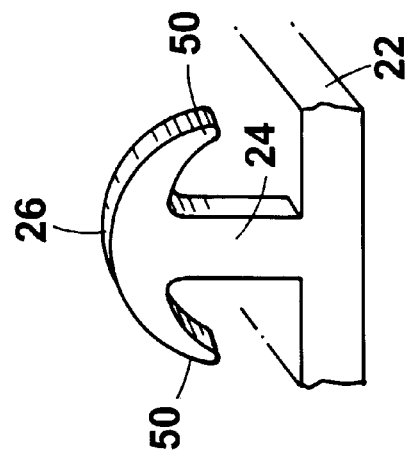

FIGS. 5A–5C illustrate fastener elements formed with dies having the die profiles of FIGS. 4A–4C, respectively, but using only a single moving gate. If the single gate is reciprocated rapidly away from and toward the base opening of the die, free-standing elements are created with substantially vertical forward and trailing sides and with head portions which are re-entrant on their transverse-facing sides. Although the shape of such fasteners is similar to that producible with previous cutting and stretching methods, using the above-described method fastener elements of these shapes may be produced without requiring the base to be stretched, and with a molecular structure of the vertical surfaces of the fastener elements such as is typical of extrusion and molding processes.

Figure 6A:
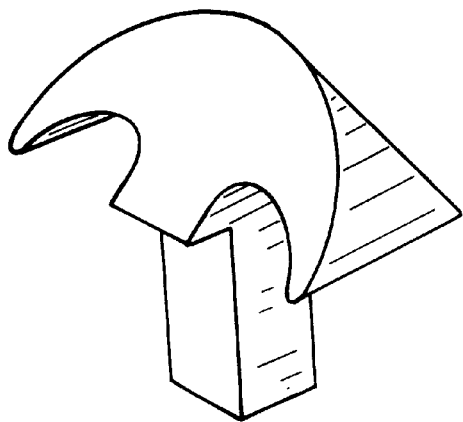
FIGS. 6A–6C illustrate fastener elements formed by extruding polymer through the die profiles of FIGS. 4A–4C, respectively, and interrupting flow with dual gates.
Figure 6B:
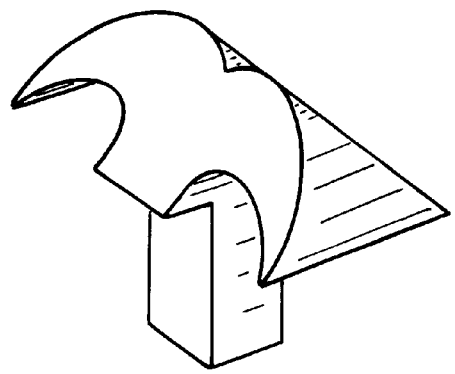
Figure 6C:
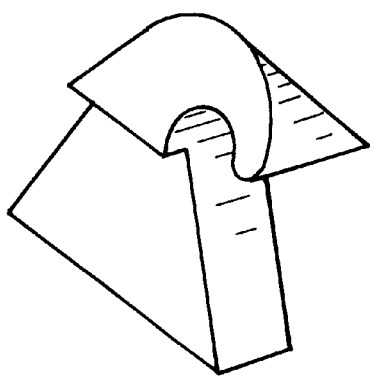

FIGS. 6A–6C illustrate fastener elements which are formed with the same die profiles as in FIGS. 5A–5C, but using two movable gates as in FIG. 1. By employing the gate sequencing illustrated in FIGS. 3A–3E, fastener elements are created with engageable ledges on their forward and trailing sides, and with re-entrant portions forming crooks on either one or both of their transverse-facing sides. Also, by controlling the rate of motion of the head-forming gate (gate 32 in FIG. 1) and minimizing the dwell time with the head-forming gate in its uppermost position, fastener elements are formed with little or no flat upper surface. Such wedge-topped fastener elements are generally preferred for penetrating a mating fastener component, either with loops or interlocking structures.

Figure 7A:
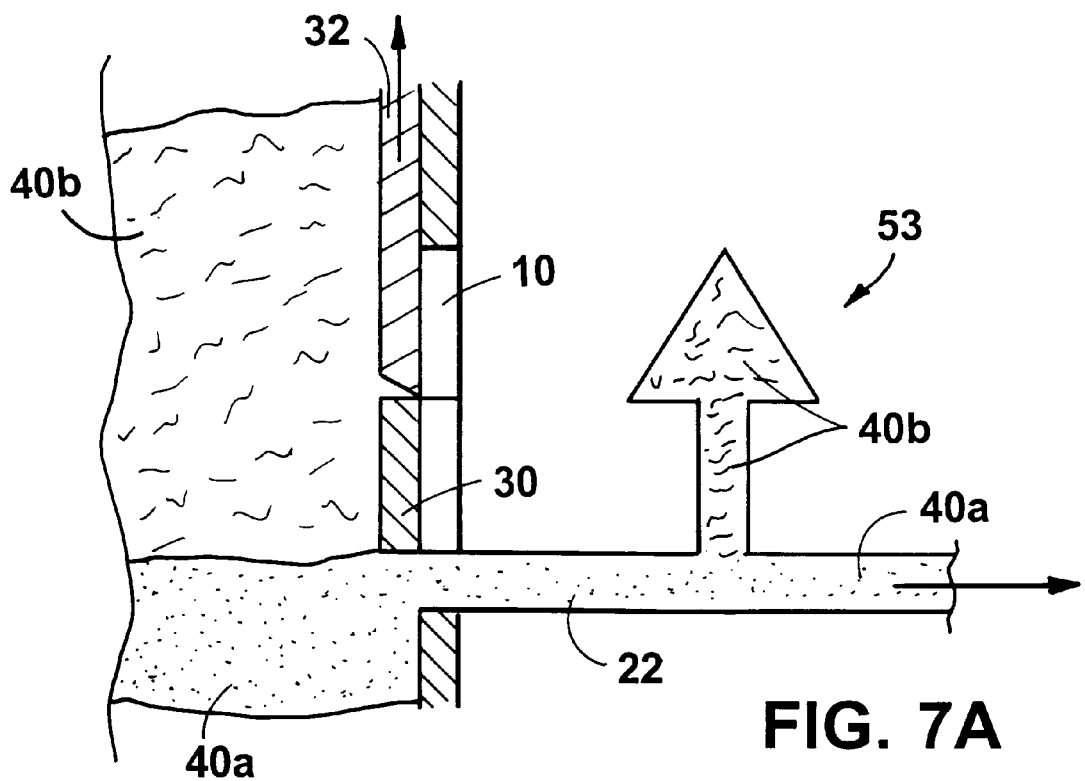
FIGS. 7A–7B illustrate two interrupted extrusion processes for forming fastener products from co-extrusions of two different polymer materials.
Figure 7B:
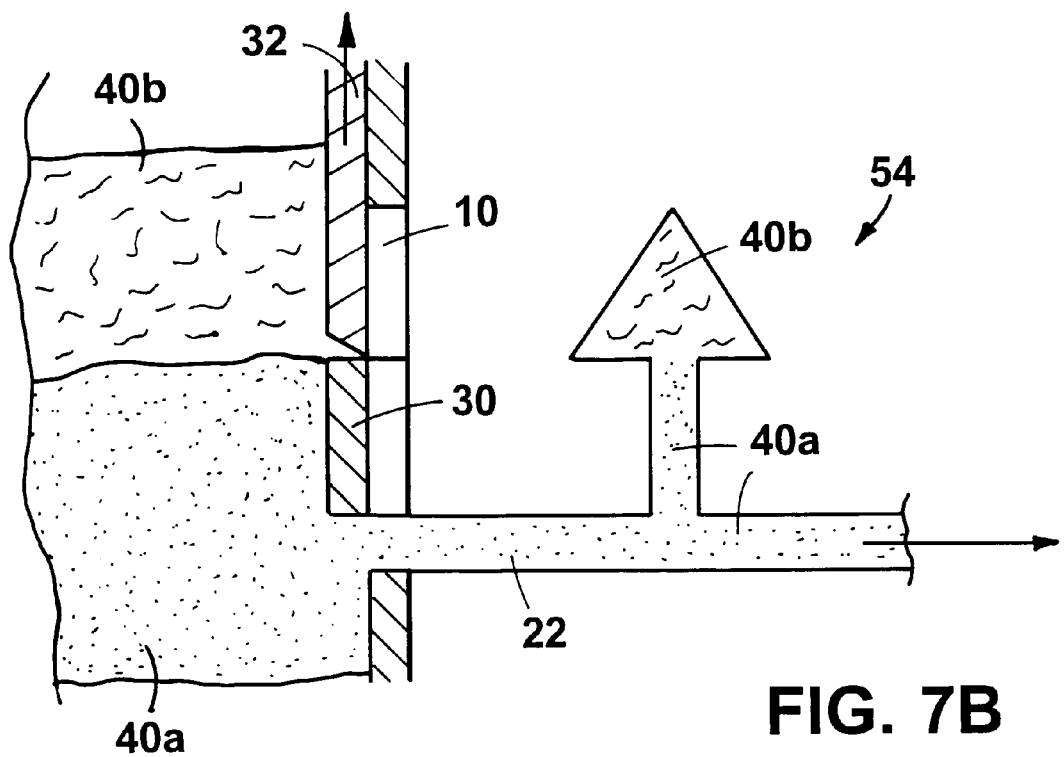

Referring to FIG. 7A, in one variation of the above-described method two different polymer materials 40a and 40b are co-extruded to form a fastener product 53 having a base 22 of material 40a and fastener elements of material 40b. The fastener product 54 of FIG. 7B is co-extruded to have a base 22 and fastener element stem portions of material 40a and fastener element head portions of material 40b. In this manner, extrusion materials may be selected to impart desired qualities to both the fastener elements and the strip-form base. For instance, a flexible material may be employed for the base and stem portions, and a stiffer material for the head portions of the fastener elements.

The extruded product formed by the above-described methods may subsequently be stretched, if desired, to either further reduce the thickness of the base of the product or to reduce the fastener element array density by increasing the distance between adjacent fastener elements in either the machine or cross-machine directions or both.

Other embodiments are also within the scope of the following claims. For instance, varying the amount of dwell time with the fastener element gates closed will produce a product with a varying fastener element spacing. Accelerating or decelerating the head-forming gate during its stroke may also be employed to produce fastener elements with curved, rather than flat, forward and trailing head surfaces.

What is claimed is:

1. A method of forming a fastener product having a continuous, sheet-form base and rows of discrete fastener elements that extend from a side of the base, the method comprising extruding a molten polymer through an extrusion die defining a die opening comprising a base opening for extrusion of the base of the product, and, contiguous therewith, a series of fastener element openings for extrusion of the rows of fastener elements, each fastener element opening comprising first and second regions and having a profile configured to form oppositely directed sides of the discrete fastener elements of one row; while periodically interrupting flow of the polymer through the fastener element openings by moving a first gate, adjacent the die opening, to interrupt the flow of polymer through the first regions of the fastener element openings, and, independent of moving the first gate, moving a second gate, adjacent the die opening, to interrupt the flow of polymer through the second regions of the fastener element openings, while continuing flow of the polymer through the base opening, thereby forming rows of upstanding fastener elements integrally extruded with a sheet-form base;

wherein the fastener elements each comprise a stem portion extending from the base and extruded through the first region of a fastener element opening, and a head portion overhanging the stem portion and integrally extruded with the stem portion through the second region of a fastener element opening, and wherein moving the first gate periodically opens and closes the first regions of the fastener element openings to form the stem portions of the fastener elements, and moving the second gate periodically opens and closes the second regions of the fastener element openings to form the head portions of the fastener elements.

2. The method of claim 1 wherein the movement of the first gate is perpendicular to the movement of the second gate.

3. The method of claim 1 wherein the fastener elements each comprise a stem portion extending from the base and extruded through the first region of a fastener element opening, and a head portion overhanging the stem portion and integrally extruded with the stem portion through the second region of a fastener element opening, and wherein moving the first gate periodically opens and closes the first regions of the fastener element openings to form the stem portions of the fastener elements, and moving the second gate periodically opens and closes the second regions of the fastener element openings to form the head portions of the fastener elements.

4. The method of claim 1 comprising, in sequence, opening the second gate to begin the formation of the head portion of a fastener element;

opening the first gate to begin the formation of the stem portion of the fastener element while leaving the second gate open.

5. The method of claim 4 further comprising, after opening the first gate, closing the first gate to complete the formation of the stem portion of the fastener element, and subsequently closing the first gate to complete the formation of the head portion of the fastener element.

6. The method of claim 1 comprising moving the second gate away from the base opening to open the second regions of the fastener element openings at a controlled rate, thereby forming fastener element head portions which are tapered in the direction of extrusion.

7. The method of claim 1 wherein the head portions of the fastener elements overhang the stem portions of the fastener elements on all sides thereof.

8. The method of claim 1 wherein the head portions of the fastener elements extend toward the base.

9. The method of claim 1 further comprising varying the timing of the movement of said gates to produce a product with non-uniform fastener element spacing.

10. The method of claim 1 comprising simultaneously co-extruding two different polymer materials to form a single fastener product.

11. The method of claim 10 comprising forming the base of the fastener product substantially of one co-extruded polymer material, and forming the fastener elements of another co-extruded polymer material.

12. The method of claim 10 wherein the fastener elements each comprise a stem portion extending from the base, and a head portion overhanging the stem portion and integrally extruded with the stem portion, the method comprising forming the base and the stem portions of the fastener elements substantially of one co-extruded polymer material, and forming the head portions of the fastener elements of another co-extruded polymer material.

13. The method of claim 10 wherein the fastener elements each having a stem portion extending from the base, and a head portion overhanging the stem portion and integrally extruded with the stem portion, the method comprising forming the head portions of the fastener elements of one of the co-extruded materials, and forming the stem portions of another of the co-extruded materials.

14. The method of claim 1 further comprising stretching the sheet-form base of the extruded product to increase the distance between adjacent fastener elements.

15. A method of forming a fastener product having a continuous, sheet-form base and rows of discrete fastener elements that extend from a side of the base, head portions of the fastener elements overhanging stem portions of the fastener elements in a longitudinal, the method comprising extruding a molten polymer through an extrusion die defining a die opening comprising a base opening for extrusion of the base of the product, and, contiguous therewith, a series of fastener element openings for extrusion of the rows of fastener elements, each fastener element opening having a profile configured to form oppositely directed sides of the discrete fastener elements of one row and having a stem-forming portion and a head-forming portion; while periodically interrupting flow of the polymer through the fastener element openings while continuing flow of the polymer through the base opening, thereby forming rows of upstanding fastener elements integrally extruded with a sheet-form base, flow of the polymer through the stem-forming portion being controlled independently of flow through the head-forming portion.

16. A method of forming a fastener product having a continuous, sheet-form base and rows of discrete fastener elements that extend from a side of the base, the method comprising extruding a molten polymer through an extrusion die defining a die opening comprising a base opening for extrusion of the base of the product, and, contiguous therewith, a series of fastener element openings for extrusion of the rows of fastener elements, each fastener element opening comprising first and second contiguous regions and having a profile configured to form oppositely directed sides of the discrete fastener elements of one row; while periodically interrupting flow of the polymer through the fastener element openings by moving a first gate to interrupt the flow of polymer through the first regions of the fastener element openings, and, independent of moving the first gate, moving a second gate to interrupt the flow of polymer through the second regions of the fastener element openings, while continuing flow of the polymer through the base opening, thereby forming rows of upstanding fastener elements, having first and second contiguous regions formed by the first and second regions of the fastener element opening integrally extruded with a sheet-form base.

17. A method of forming a fastener product having a continuous, sheet-form base and rows of discrete fastener elements that extend from a side of the base, the method comprising extruding a molten polymer through an extrusion die defining a die opening comprising a base opening for extrusion of the base of the product, and, contiguous therewith, a series of fastener element openings for extrusion of the rows of fastener elements, each fastener element opening having a profile configured to form oppositely directed sides of the discrete fastener elements of one row; while periodically interrupting flow of the polymer through the fastener element openings, while continuing flow of the polymer through the base opening, thereby forming rows of upstanding fastener elements integrally extruded with a sheet-form base; and varying the frequency of said interruption so as to vary the longitudinal spacing of said fastener elements.

18. A method of forming a fastener product having a continuous, sheet-form base and rows of discrete fastener elements that extend from a side of the base, head portions of the fastener elements overhanging stem portions of the fastener elements in a longitudinal direction, the method comprising simultaneously co-extruding two different molten polymers through an extrusion die defining a coextrusion die opening comprising a base opening for extrusion of the base of the product, and, contiguous therewith, a series of fastener element openings for extrusion of the rows of fastener elements, each fastener element opening having a profile configured to form oppositely directed sides of the discrete fastener elements of one row; while periodically interrupting flow of the polymer through the fastener element openings while continuing flow of the polymer through the base opening, thereby forming rows of upstanding fastener elements integrally extruded with a sheet-form base.

19. The method of claim 18 comprising forming the base of the fastener product substantially of a first co-extruded polymer material, and forming the fastener elements of a second co-extruded polymer material.

20. The method of claim 19 wherein the first polymer material is flexible and the second polymer material is relatively stiffer than the first polymer material.

21. The method of claim 18 wherein one of said molten polymers is extruded through said base opening, and the other polymer is extruded through said fastener openings.

22. The method of claim 18 wherein the fastener elements each comprise a stem portion extending from the base, and a head portion overhanging the stem portion and integrally extruded with the stem portion, the method comprising forming the base and the stem portions of the fastener elements substantially of one co-extruded polymer material, and forming the head portions of the fastener elements of another co-extruded polymer material.

23. The method of claim 18 wherein the fastener elements each having a stem portion extending from the base, and a head portion overhanging the stem portion and integrally extruded with the stem portion, the method comprising forming the head portions of the fastener elements of one of the co-extruded materials, and forming the stem portions of another of the co-extruded materials.

* * * * *